United States Patent [19]

Arizpe

[11] 4,413,467
[45] Nov. 8, 1983

[54] DISPOSABLE BAG MOUNTING AND SHUTDOWN MECHANISM FOR ROTARY LAWN MOWER

[76] Inventor: Ramiro Arizpe, 9938 Donegal, Dallas, Tex. 75218

[21] Appl. No.: 393,126

[22] Filed: Jun. 28, 1982

Related U.S. Application Data

[62] Division of Ser. No. 236,537, Feb. 20, 1981, Pat. No. 4,345,418.

[51] Int. Cl.³ .................... A01D 75/20; A01D 69/10
[52] U.S. Cl. .................... 56/11.3; 56/10.5; 56/202
[58] Field of Search .................... 56/10.5, 202, 11.3

[56] References Cited

U.S. PATENT DOCUMENTS

| | | | |
|---|---|---|---|
| 3,228,177 | 1/1966 | Coates | 56/10.5 |
| 3,230,695 | 1/1966 | West | 56/10.5 |
| 3,750,378 | 8/1973 | Thorud et al. | 56/10.5 |
| 3,890,772 | 6/1975 | Seifiert et al. | 56/202 |
| 3,928,956 | 12/1975 | Boyer | 56/202 |
| 4,043,102 | 8/1977 | Uhlinger | 56/202 |
| 4,149,363 | 4/1979 | Woelffer et l. | 56/202 |
| 4,214,424 | 7/1980 | Gobin | 56/202 |
| 4,221,108 | 9/1980 | Owens | 56/10.5 |
| 4,236,494 | 12/1980 | Fairchild | 56/10.5 |
| 4,244,160 | 1/1981 | Carolan | 56/202 |

Primary Examiner—Paul J. Hirsch
Attorney, Agent, or Firm—Kenneth R. Glaser

[57] ABSTRACT

A rotary lawn mower is provided with a grass collection bag arrangement comprising a bag holder having a flexible skirt for supporting a disposable collection bag. The bag holder is mountable on a mounting plate facing rearwardly on the mower housing and close coupled to a grass discharge chute formed on the housing. The bag holder is retained on the mounting plate by a pivotally mounted lever engagable with the bag holder frame and operable in the release position to actuate an ignition grounding switch to ground the ignition system of the mower engine. The mower engine power takeoff shaft is coupled to a rotary blade which is mounted on a hub having a cylindrical brake drum fixed thereto. A spring coil brake band is disposed around the brake drum and pivotally mounted at one end to the mower housing and connected at the opposite end to a flexible cable which is connected to the bag holder retaining lever. Movement of the lever to the bag release position grounds the ignition circuit of the engine and engages the brake to arrest rotation of the mower blade. The bag holder is adapted to support conventional disposable trash collection bags and includes support members on the lower end of the skirt adapted to be mounted on the mower handle to form a closure supporting the collection bag when the bag is mounted on the mower.

8 Claims, 7 Drawing Figures

U.S. Patent   Nov. 8, 1983   Sheet 1 of 3   4,413,467
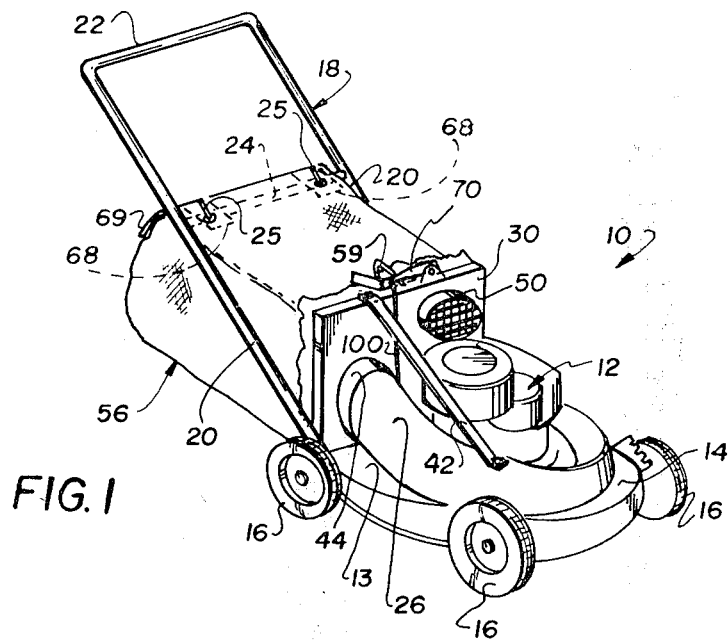
FIG. 1
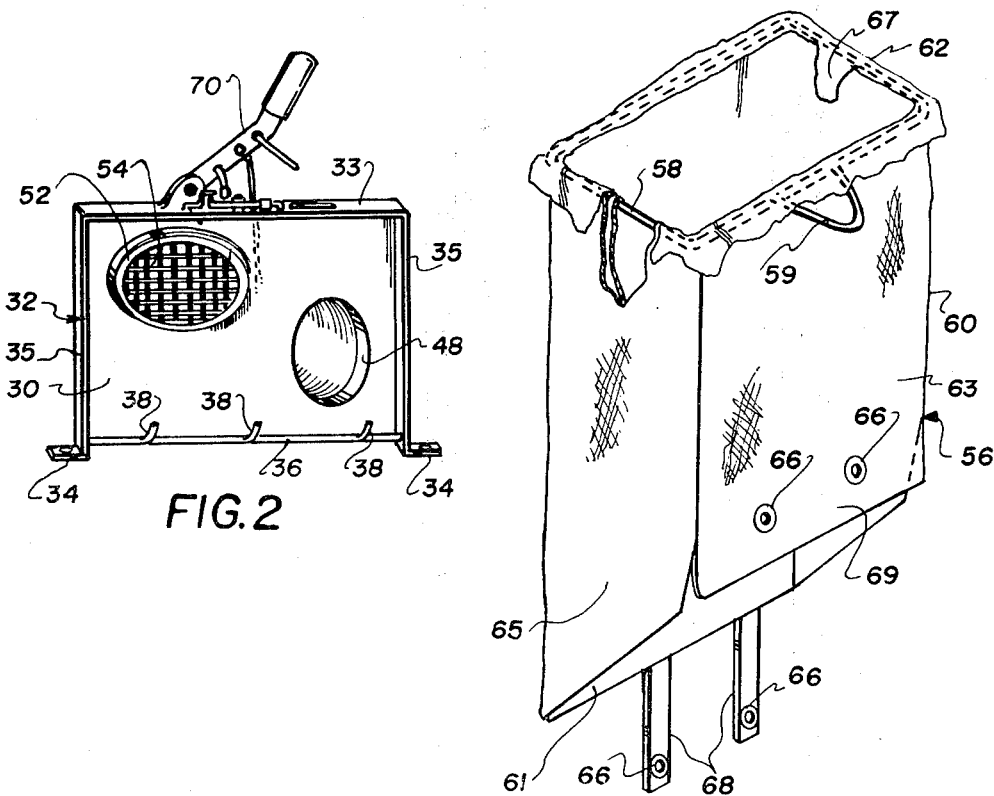
FIG. 2
FIG. 3

DISPOSABLE BAG MOUNTING AND SHUTDOWN MECHANISM FOR ROTARY LAWN MOWER

This application is a division of application Ser. No. 236,537, field Feb. 20, 1981, now U.S. Pat. No. 4,345,418.

BACKGROUND OF THE INVENTION

1. Field of the Invention

This invention pertains to a grass catching bag mounting arrangement for a rotary lawn mower including a securing and release mechanism for the bag support which automatically interrupts the engine ignition and brakes the mower blade drive shaft when actuated to release the bag support member.

1. Background Art

In the art of rotary lawn mowers and the like there have been a number of devices developed for mounting on the mower to catch grass clippings and leaves to eliminate raking such debris after mowing the lawn. One type of device widely used comprises a flexible bag which is pervious to air and which is connected to a discharge chute of the mower blade housing for collecting grass, leaves and other debris entrained in the air stream generated by the rotating mower blade. A disadvantage of this type of bag is that it must be relatively ruggedly built to withstand continuous use and, in order to minimize the weight and bulk, is generally of inadequate capacity thereby requiring frequent operations to stop the mower, remove the bag, dump the contents collected from the bag to a trash receptacle and then replace the bag on the mower. Quite often such types of bags are also mounted on one side of the mower which limits the maneuverability of the mower in mowing next to shrubbery or structures.

There have also been efforts to develop mowers provided with disposable bags which are supported in a bag holder mounted rearwardly of the mower housing and having an upwardly facing inlet requiring a relatively long discharge chute from the mower housing with a substantial vertical run. Such arrangements have not been satisfactory in that the power and air velocity requirements sufficient to move the grass cuttings through the elongated discharge chute and a relatively small bag mouth are generally inadequate. Efforts to overcome the disadvantages of the previous described disposable bag type debris catching arrangements have also resulted in the type of apparatus which receives the discharge flow stream from the mower through a lateral chute. As previously mentioned this type of arrangement is not suitable in that even though the bag is mounted relatively close to the point of discharge of the stream of cuttings from the mower housing the maneuverability and ease of operation of the mower is inhibited by the laterally projecting bag and support structure therefore.

In power mowers provided with grass and leaf catching attachments it is also desirable to provide for mechanism for securing and releasing the bag or bag holder which is operable to minimize the chance of operator injury from mower and from the high velocity stream of cuttings and other debris by shutting down the mower engine or motor before the bag is removed from the mower.

It has also been determined that it is desirable to provide debris collection means for rotary power mowers and the like which is adapted to use conventional disposable bags of the type which are essentially standard commercial items, and also the type required by many municipalities for trash collection.

The present invention overcomes substantially all of the deficiencies of prior art apparatus in regard to the aforementioned problems as will be appreciated from the following summary and detailed description of the present invention.

SUMMARY OF THE INVENTION

The present invention provides an improved arrangement of a grass and leaf collection apparatus for a rotary type power lawn mower or the like wherein a disposable type collection bag is provided with an improved holder mounted on a supporting frame which is adapted to be close coupled to a discharge chute of a mower blade housing wherein substantially all of the debris entrained in a moving air stream created by the rotating mower blade is conveyed to the bag for eventual disposal without transferring the debris to another container.

In accordance with the present invention a rotary type power lawn mower is provided with a generally vertically disposed plate mounted on the mower blade housing and facing rearwardly of the mower. The mounting plate is adapted to support the frame of a holder for a disposable collection bag to be carried by the mower between spaced apart rearwardly extending handlebar members. The bag holder mounting plate is arranged to be close coupled to a discharge chute of the mower blade housing and is provided with an air discharge vent to permit air relatively free of grass and other debris to be ejected from the disposable bag after the debris is collected in the bag. The bag holder and mounting plate provide a large unrestricted opening into the collection bag which substantially improves the performance of the present invention as compared with prior art grass collection apparatus for power mowers.

In accordance with another aspect of the present invention there is provided an improved bag holder which is particularly adapted to easily and conveniently support a disposable plastic trash collection bag of a standard type and size commercially available and wherein the bag may be easily mounted on the holder and removed from the holder when it is full of debris. The bag holder of the present invention is removably mountable on a mounting plate on the mower and is retained thereon by a locking lever which also functions to actuate mower shutdown mechanisms.

In accordance with yet another aspect of the present invention there is provided a mechanism for releasably securing a collection bag and holder mounted on a power lawn mower which includes a locking member operable to actuate a switch for interrupting, for example, the ignition circuit to effect shutdown of a mower powered by a spark ignited internal combustion engine. The locking member is preferably mounted on top of a rearwardly facing collection bag mounting plate and includes a projection for engaging the frame of the collection bag holder to retain the holder and the bag on the mounting plate. The locking member also includes a switch actuating member for actuating an ignition grounding switch to effect shutdown of the engine when the locking member is actuated to release the collection bag holder.

In accordance with yet a further aspect of the present invention a power lawn mower including the improved means for collection of grass and other debris is provided with brake means operable to brake the rotation of the mower blade in response to actuation of a lever for releasing the debris collecting bag and its holder from the mower. The brake means of the present invention is provided by a coiled band type brake and drum arrangement mounted on the engine drive shaft between the mower blade and the blade housing and is actuatable by a cable leading from the brake band to a locking lever for the collection bag holder. Accordingly, when the mower operator actuates the locking lever to release the debris collecting bag from the mower, rotation of the mower blade is braked together with the engine power takeoff shaft. Such an arrangement is advantageous in both self propelled as well as push type power mowers of the general type disclosed in the specification hereof.

As will be appreciated by those skilled in the art the present invention provides a number of improvements relating to rotary power lawn mowers and the like, which improvements will be further understood and appreciated upon reading the following detailed description and claims in conjunction with the drawings.

BRIEF DESCRIPTION OF THE DRAWINGS

FIG. 1 is a perspective view of a rotary power lawn mower including the improved grass and leaf collection bag arrangement of the present invention;

FIG. 2 is a perspective view of the mounting plate for the collection bag and holder of the present invention showing the opposite side of the plate from that shown in FIG. 1;

FIG. 3 is a perspective view of the mower collection bag and holder in accordance with the present invention;

DESCRIPTION OF THE PREFERRED EMBODIMENT

Figure 4:
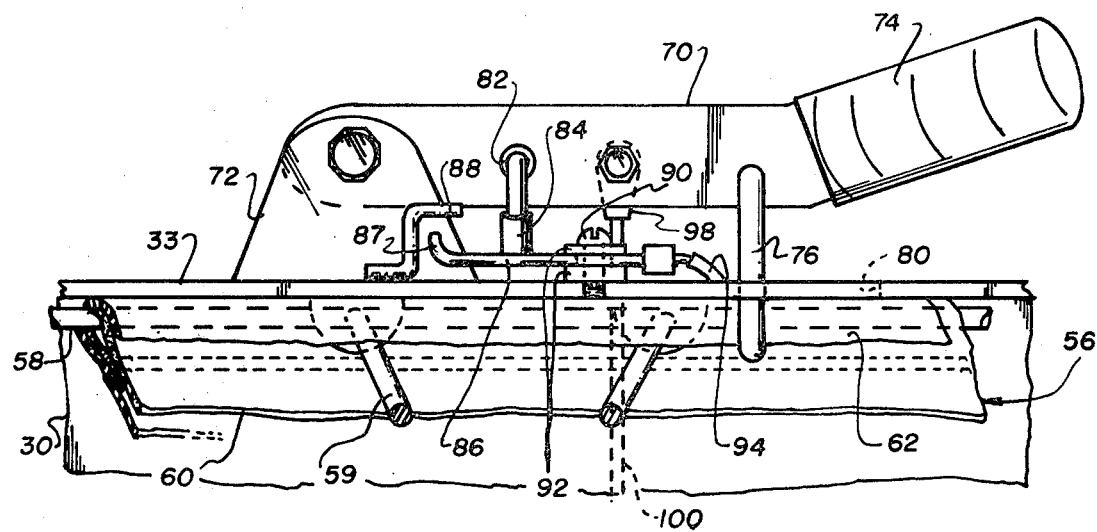
FIG. 4 is a vertical elevation detail view of the bag holder locking lever on a larger scale.

Referring to FIG. 1 of the drawings there is illustrated a rotary type power lawn mower generally designated by the numeral 10. The lawn mower 10 is of a type having a lightweight air cooled internal combustion engine 12 mounted on a main mower or blade housing 14 which also provides a main frame for the mower. The engine 12 has a conventional vertically disposed power takeoff shaft, not shown in FIG. 1, which projects vertically downwardly through the housing 14 and is connected to a rotary mower blade, also not shown in FIG. 1. The housing 14 is supported on conventional spaced apart wheels 16, three shown in FIG. 1 and may be of the push type or provided with self propulsion mechanism of a type well known. The mower 10 also includes a generally U-shaped handle 18 having spaced apart tubular handlebar members 20 projecting rearwardly in an upwardly inclined direction from the housing 14. The handle 18 is suitably secured to the housing 14 in a conventional way and also includes a transverse hand grip member 22 and an intermediate cross bar 24. The mower 10 as described herein-above is generally of conventional construction and may be one of several types commercially available. However, a preferred model for use in accordance with the present invention is manufactured under the trademark Snapper as model nos. V-210 or V-212P. It is believed that the general construction of the mower 10 as described herein is well known to those skilled in the art except for the modifications and improvements in accordance with the present invention.

The mower 10 is also provided with a hollow discharge chute 26 comprising a generally scroll like duct integrally formed with the housing 14, or comprising a detachable part thereof, also in accordance with known practice in the design of rotary type power mowers. The discharge chute 26 is operable to convey a relatively high velocity air stream having entrained therein the grass clippings, leaves, and other debris impelled by the mower blade when the mower 10 is in operation. The discharge chute 26 is formed to direct the flow of debris laden air generally horizontally and rearwardly of the housing 14 towards the handle member 22.

In accordance with the present invention the mower 10 is provided with a generally vertically disposed rectangular plate 30 suitably mounted on the housing 14 and facing rearwardly between the spaced apart handlebar members 20. Referring to FIG. 2 also, the plate 30 includes a peripheral flange member 32 having a portion 33 disposed along the top side of the plate and side portions 35 along the opposite lateral sides thereof. The flange 32 may have integral oppositely facing mounting bracket portions 34 adapted to mount the plate on the generally horizontal deck 13 of the mower housing 14 by suitable conventional threaded fasteners or the like, not shown. The lower edge of the mounting plate 30 includes a relatively small diameter retaining rod 36 suitably fixed to the plate 30 or formed as an integral part thereof. The rod 36 includes a plurality of spaced apart projections 38 adapted to assist in retaining a collection bag holder to be described in further detail herein.

Referring further to FIG. 1, the plate 30 also includes a support bracket 40 extending from the flange 32 forwardly and downwardly to a suitable attachment on the discharge chute 26. The discharge chute 26 is adapted to be close coupled to the plate 30 by a suitable collar 44 integrally formed on the plate 30 and adapted to be in close fitting sleeved relationship around the distal end of the chute. As shown in FIG. 2, the collar 44 delimits a relatively large oval shaped inlet opening 48 formed in the plate 30 through which the debris laden air stream is discharged from the chute 26. As shown in FIGS. 1 and 2, the plate 30 is also provided with an air outlet duct 50 spaced from the inlet opening 48 and provided with a removable screen member 52. The member 52 may be provided with a relatively coarse mesh screen 54, as shown, for use in operation of the mower 10 for gathering leaves, for example, or the screen member 52 may be provided with a relatively fine mesh screen, not shown, mounted on the plate 30 in place of the member shown for operation of the mower when it is being primarily used for lawn mowing. The advantage of having separate screen members 52 with relatively coarse and fine mesh screens assures that grass and other fine particles are not discharged from the collection bag through the air discharge duct 50, but during operations for leaf bagging a relatively coarse mesh screen should be used to prevent clogging of the air outlet duct.

Referring to FIGS. 1 and 3, the improved grass and leaf collection means for the mower 10 in accordance with the present invention includes a bag holder, generally designated by the numeral 56, which comprises a rectangular frame member 58 formed from, for example, steel rod or tube, to which is fastened by suitable means a flexible skirt 60 which may be formed of durable fabric such as Dacron or nylon. The skirt 60 is fixed to the frame 50 in any suitable manner such as by a sewn hem or the like. The skirt 60 includes a rear or lower panel 61 which is longer than a front or upper panel 63 and is suitably connected thereto by side panels 65 and 67. The skirt 60 also includes a pair of spaced apart grommets 66 in a lower flap portion 69 of the front panel 63, as shown. The skirt 60 further includes a pair of spaced apart straps 68 extending from the lower edge of the panel 61 as shown in FIG. 3. The straps 68 include grommets 66 fastened thereto in a known way.

The holder 56 is particularly adapted to support a suitable collection bag, generally designated by the numeral 62 in FIGS. 1 and 3, which is adapted to be inserted within the inner perimeter of the frame 58 and having its upper edge folded over at the frame, as illustrated in FIG. 3. In FIG. 3, a portion of the skirt panel 65 and the collection bag 62 are shown broken away to illustrate the overall arrangement. In a preferred embodiment in accordance with the present invention the bag holder 56 is dimensioned to hold a trash bag 62 of a type widely available commercially and required by some municipalities for trash disposal. Such bags are nominally of approximately 30 gallon capacity and are sold under a variety of brand names. By providing the bag holder 56 to support the mouth of the bag to form an opening substantially larger than the cross-sectional flow area of the discharge chute 26 there is no tendency to choke the flow of grass and debris as it enters the bag.

The frame 58 for the bag holder 56 is proportioned to have peripheral dimensions only slightly smaller than the area delimited by the flange 32 and the retaining bar 36 whereby the bag holder may be mounted on the plate 30 and suitably retained thereon by a pivotally mounted locking or retaining lever generally designated by the numeral 70. Reffering also to FIGS. 4 and 5 of the drawings the lever 70 is mounted on the plate 30 by a vertically upstanding bracket member 72 which is fixed to the plate 30 adjacent the horizontal top portion 33 of the flange 32. The lever 70 includes suitable pivot means such as a bolt 74 adapted to secure the lever 70 to the bracket 72. The lever 70 includes a handle portion 75 and a generally downwardly projecting retaining pin 76 having a laterally projecting leg portion 78 fixed to the lever 70. The pin 76 is adapted to project through a slot 80 formed in the flange portion 33 to engage the bag holder 56 adjacent the frame member 58 to retain the holder on the mounting plate 30. When the lever 70 is pivoted upwardly in an anti-clockwise direction, viewing FIG. 4, the pin 76 moves out of the slot 80 to permit release of the bag holder 56 from retention on the plate 30. The lever 70 is provided with a second downwardly extending projection 82 fixed to the lever and including a cap portion 84. The cap 84 is made of an electrically nonconductive material and is adapted to engage a flat metal spring member 86 comprising a contact for an ignition shorting switch for the engine 12. The contact member 86 is connected to one end of an ignition grounding wire 94. A generally upwardly projecting end portion 87 of the switch contact 86 is adapted to engage a metal bracket 88 when the contact member is not biased into the position shown by the actuating member 82. The bracket 88 is suitably fixed to the flange portion 33 and is adapted to be in electrically conductive communication with the engine 12 in such a manner that when the contact 86 engages the bracket 88 the ignition circuit of the engine 12 is grounded to render the circuit inoperable to provide an ignition spark to the engine.

In the position shown in FIG. 4 the switch, provided by the contacts 86 and 88, is open whereby the ignition circuit for the engine 12 is operable in the normal manner. The operation of the grounding switch is similar to that disclosed in U.S. Pat. No. 3,228,177. The switch contact member 86 is suitably mounted on the flange portion 33 by a fastener 90 and is insulated from the fastener as well as the flange portion 33 by nonconductive washers 92 disposed on both sides of the contact member.

Figure 5:
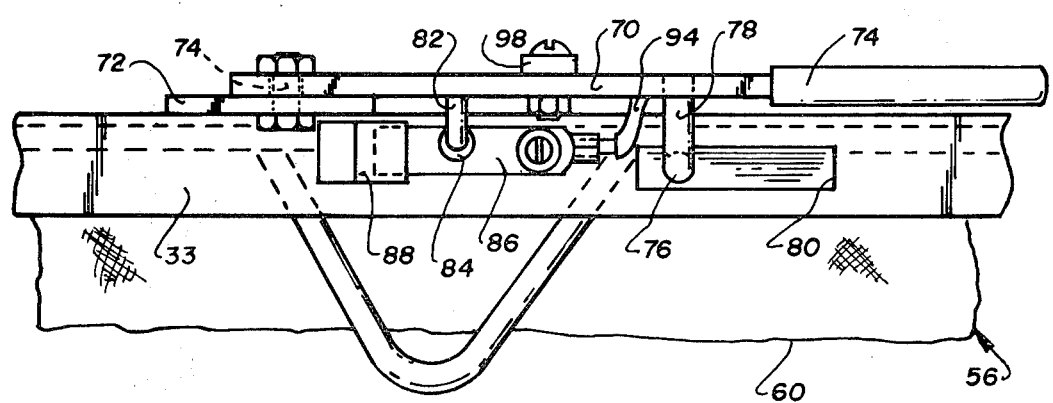
FIG. 5 is a plan view of the locking lever shown in FIG. 4.
Figure 6:
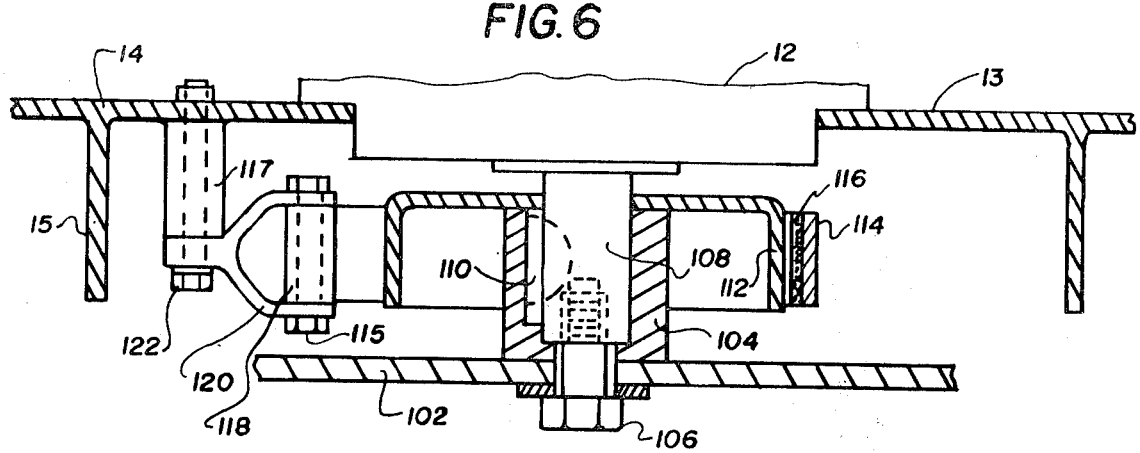
FIG. 6 is a section view taken along the line 6—6 of FIG. 7.
Figure 7:
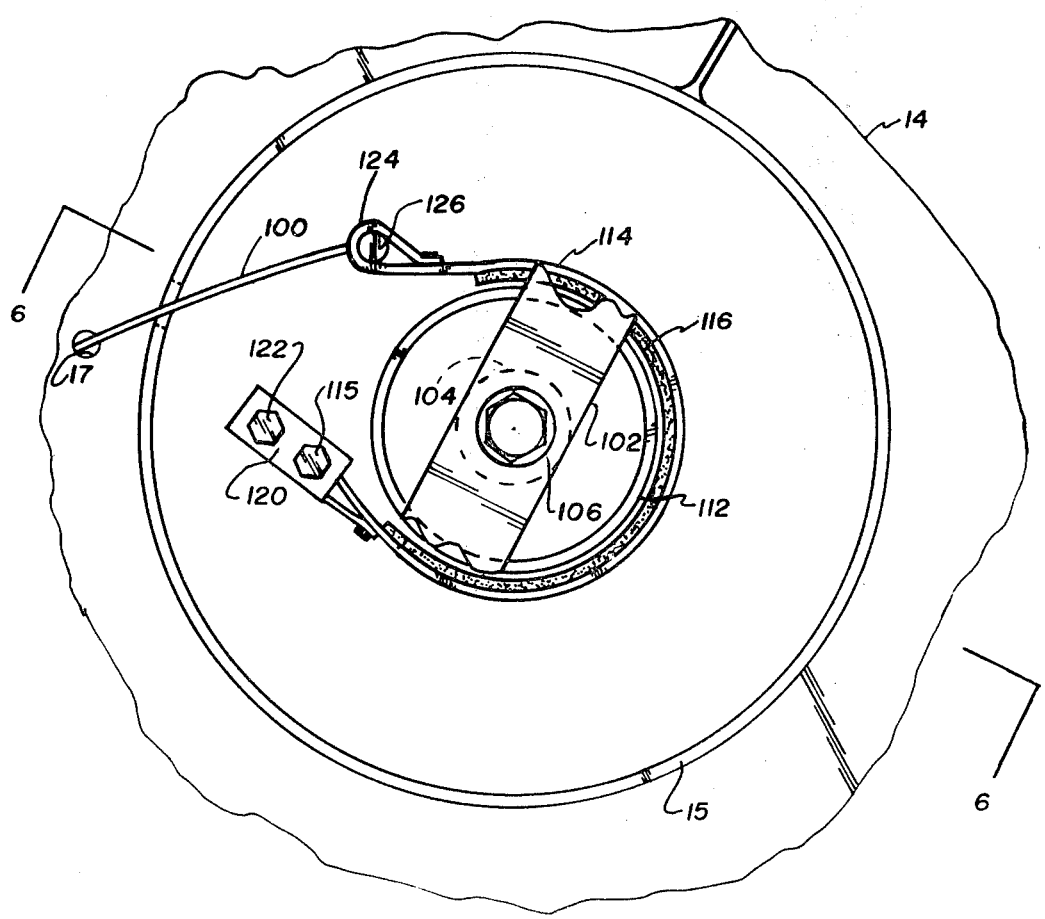
FIG. 7 is a plan view of the underside of the mower housing illustrating the arrangement of the brake for the mower shaft in accordance with the present invention.

As shown in FIGS. 4 and 5 the retaining lever 70 is also connected to an anchor member 98 for a flexible cable 100 which leads to a brake mechanism for the rotary blade of the mower 10. Referring to FIG. 7, which is a plan view of the underside of the housing 14, there is shown a portion of the mower blade 102 which is mounted on a hub 104. Referring also to FIG. 6, the blade 102 and the hub 104 are suitably retained on a power takeoff shaft 108 of the engine 12 by a threaded bolt 106. The hub 104 is also adapted to be keyed to the shaft 108 for rotation therewith by a suitable interfitting key 110. The hub 108 is fixed to a circular brake drum 112 which is surrounded by a flexible brake band 114 having a suitable brake lining 116 formed thereon. The brake band 114 has a tubular shaped end portion 118 adapted to the pivotally mounted on a clevis 120 by a bolt 115. The clevis 120 is suitably pivotally retained on a boss 117 on the housing 14 by a bolt 122, for example. The opposite end 124 of the brake band 114 is also formed in a loop to suitably retain an anchor member 126 for the cable 100. The cable 100 extends through a suitable opening in a circular collar portion 15 of the housing 14, through a hole 17 in the housing and upwardly to the connection with the lever 70 previously described herein.

Accordingly, when the lever 70 is pivoted upwardly in an anti-clockwise direction, viewing FIG. 4, the cable 100 is operable to pull the brake band 114 into engagement with the drum 112 to brake the rotation of the blade 102 and the engine power takeoff shaft 108. Therefore, when it is desired to remove the bag and bag holder 56 from the mower, if the mower operator has not already shut off the engine 12, actuation of the lever 70 to release the bag holder automatically grounds the ignition circuit of the engine and arrests rotation of the mower blade 102. It is contemplated that the ignition grounding mechanism associated with the lever 70 and the brake mechanism described in conjunction with FIGS. 6 and 7 of the drawings could be used separately in connection with the improved collection bag arrangement of the present invention. The braking mechanism illustrated in FIGS. 6 and 7 would be particularly advantageous for use in self propelled type mowers to minimize the chance of accidental movement of the mower while a bag was being installed on or removed from the mounting plate 30. However, both mechanisms are desirably used on the mower 10, for example, to minimize the risk of injury to the mower operator.

In operation, preparatory to mowing a lawn or collecting leaves and other debris therefrom, the bag holder 56 is first removed from the mounting plate 30 by pivoting the lever 70 upwardly away from the flange portion 33 sufficiently to allow the pin 76 to move clear of the frame 58. With the lever 70 in the release position the switch contact member 86 is engaged with the contact 88 to prevent the engine 12 from running or being started. The brake band 114 is also engaged with the drum 112 to prevent rotation of the blade 102. The bag holder 56 is adapted to be grasped by a handle 59 fixed to the frame member 58 and projecting downwardly at an angle with respect to the plane of the frame member so as to clear the flange 32. A conventional lightweight plastic disposable trash bag is then inserted in the bag holder 56 and the upper rim of the bag is turned down around the edge of the bag holder as illustrated in FIG. 3. The bag holder 56 is then installed on the mower by placing the frame member 58 within the flange 32 on the mounting plate 30. The frame 58 is retained on the mounting plate by the flange 32 and by the relatively short projections 38 together with the pin 76 on the lever 70.

Additional support for the bag and the bag holder 56 is provided by closing the open end of the skirt 60. The ends of the straps 68 are secured on respective spaced apart, generally upwardly projecting anchor pins 25 mounted on the cross bar 24, as shown in FIG. 1, by inserting the grommets 66 over the pins. The lower flap portion 69 of the skirt panel 63 is then secured to the pins 25 by inserting the spaced apart grommets 66 over the pins as shown in FIG. 1, also. The bag holder 56 and the bag 62 are now securely fastened to the mower and suitably supported thereon to allow the bag to assume its maximum inflated shape so that a substantial quantity of grass cuttings and other debris may be collected before it is necessary to remove the bag. Thanks to the close coupling of the discharge chute 26 to the bag mounting plate 30 and the arrangement of the bag holder 56 and the mounting plate which provides a large flow area for the material discharged from the chute there is no tendency to clog the chute 26 during operation of the mower to pick up grass cuttings, leaves and other debris normally conveyed by the air stream impelled by the mower blade. Moreover, the generous proportions of the mounting plate 30 conforming substantially to the maximum opening area attainable by the mouth of the bag 62, together with the air vent 52, also minimizes the back pressure within the chute 26 and assures a relatively free flow of material into the collection bag. As the air stream conveying the cuttings and other debris is ejected into the bag internal and gravitational forces cause substantially all of the material to collect in the bag whereby relatively clean air is vented through the duct 50.

When the bag 62 is full the operator will stop the mower engine, lift the flap 69 off of the projections 25 as well as remove the straps 68, and then pull the lever 70 upward to release the bag holder from the mounting plate 30. However, if the operator should attempt to remove the bag holder without shutting off the engine 12, once the lever is actuated as described, the ignition grounding switch and the braking mechanism of the present invention will shut off the engine and stop rotation of the mower blade before the bag holder can be removed from the mower.

As the bag holder 56, with considerable contents in the bag 62, is removed from the plate 30 any grass clippings or other debris which may fall out of the bag will not tend to collect around the mounting plate 30 due to the lack of any flange surface along the bottom edge sufficient to retain a substantial amount of cuttings therealong. Whatever cuttings might fall out of the bag as it is removed from the plate will fall to the deck of the mower housing 14 and may be easily swept away. When the bag holder 56 is removed from the mower 10 it is held upright and removed from the bag 62 by merely pulling the skirt 60 upwardly away from the bag which may be left resting on the ground. The disposable bag 62 may then be closed and disposed of, as desired. Accordingly, the bag holder 56 provides a particularly convenient way of handling disposable collection bags wherein the bag 62 does not have to be lifted out of the holder 56. Moreover, the provision of the bag holder 56, which is particularly adapted for use with conventional disposable trash bags, does not require the transfer of the material collected by the mower 10 from a collection bag to a disposable bag, since the disposable bag is mounted directly on the mower itself.

It will be appreciated by those skilled in the art that various modifications and substitutions may be made to the apparatus disclosed herein and shown in the accompanying drawings without departing from the scope and spirit of the invention recited in the appended claims.

What I claim is:

1. In a rotary power lawnmower;
a housing, motor means mounted on said housing and including a power takeoff shaft drivably connected to rotary mower blade means, brake means operably connected to said blade means to arrest rotation of said blade means, said housing including a discharge chute for conveying grass cuttings entrained in a moving air stream generated by said blade means away from said housing, means on said housing for supporting grass collection bag means in flow receiving communication with said discharge chute for receiving said grass cuttings, and a movable locking member associated with said support means and adapted to be moved between locking and release positions for releasably retaining said bag means on said support means, and actuating means interconnecting said brake means and said locking member and responsive to the movement of said locking member to said release position to cause said brake means to brake the rotation of said blade means.

2. In a rotary power lawnmower and the like:
a housing, motor means mounted on said housing and including a power takeoff shaft drivably connected to rotary mower blade means and brake means operable to arrest rotation of said blade means, said housing including a discharge chute for conveying grass cuttings and debris entrained in a moving air stream generated by said blade means away from said housing, a mounting plate disposed on said mower and adapted to form a closure over the mouth of a disposable grass collection bag, means forming an opening in said plate in flow receiving communication with said discharge chute for discharging grass cuttings directly into said bag from said chute, a collection bag holder including a frame member and a flexible bag holding member, said frame member being adapted to be releasably mounted on said plate whereby said bag holder extends generally horizontally from said plate rearward of said housing, a movable locking member mounted on said plate and adapted to be moved between locking and release positions with respect to said bag holder for releasably retaining said bag holder and a bag held thereby on said plate, and actuating means interconnecting said brake means and said locking member and responsive to the movement of said locking member to said release position to brake the rotation of said blade means.

3. The invention set forth in claim 2 wherein:
said brake means includes a brake drum fixed for rotation with said blade means and a brake band disposed around said drum, said brake band being pivotally connected to said mower at one end, the opposite end of said brake band being connected to one end of a flexible cable connected at its opposite end to said locking member whereby when said locking member is moved to the release position with respect to said bag holder said brake means is actuated to brake the rotation of said blade means.

4. The invention set forth in claim 2 wherein:
said locking member comprises a lever pivotally mounted on said plate, said mower includes switch means operable to deenergize said motor means, and lever being operable to activate said switch means when moved from a locking position to a release position to deenergize said motor means when said bag holder is released from said plate.

5. The invention set forth in claim 4 wherein:
said plate includes a peripheral flange adapted to at least partially surround said frame member, said lever includes a portion engageable with said frame member to retain said bag holder engaged with said plate.

6. The invention set forth in claim 5 wherein:
said switch means is mounted on said flange and said lever is operable to actuate said switch means when moved between locking and release positions.

7. The invention set forth in claim 6 wherein:
said motor means comprises a spark ignited internal combustion engine, said switch means being adapted to be in circuit with the ignition system of said engine and operable to close a circuit for grounding said ignition system when said lever is moved to said release position.

8. The invention set forth in claim 2 wherein:
said mower includes handle means connected to said housing and projecting generally rearwardly therefrom, said handle means comprising a pair of spaced apart longitudinal members, and said bag holding member includes means adapted to be supported by said handle means.

* * * * *

UNITED STATES PATENT AND TRADEMARK OFFICE
CERTIFICATE OF CORRECTION

PATENT NO. : 4,413,467
DATED : November 8, 1983
INVENTOR(S) : RAMIRO ARIZPE

It is certified that error appears in the above-identified patent and that said Letters Patent are hereby corrected as shown below:

In column 7, line 50, "internal" should be --inertial--; and

In column 9, line 26 (Claim 4, line 5), "and" should be -- said--.

Signed and Sealed this

Twenty-first Day of February 1984

[SEAL]

Attest:

GERALD J. MOSSINGHOFF

Attesting Officer

Commissioner of Patents and Trademarks